US010698165B2

(12) United States Patent
Kadar-Kallen et al.

(10) Patent No.: US 10,698,165 B2
(45) Date of Patent: Jun. 30, 2020

(54) MULTI-FIBER FERRULE CONNECTOR (71) Applicant: TYCO ELECTRONICS CORPORATION, Berwyn, PA (US)

(72) Inventors: Michael Aaron Kadar-Kallen, Harrisburg, PA (US); Shelly Ann Buchter, East Berlin, PA (US); Nancy Lee Reeser, Lemoyne, PA (US); Lalitkumar Bansal, Harrisburg, PA (US); Donald Eugene Dellinger, Hellam, PA (US); David Donald Erdman, Hummelstown, PA (US)

(73) Assignee: TE Connectivity Corporation, Berwyn, PA (US)

( * ) Notice: Subject to any disclaimer, the term of this patent is extended or adjusted under 35 U.S.C. 154(b) by 315 days.

(21) Appl. No.: 13/840,447

(22) Filed: Mar. 15, 2013

(65) Prior Publication Data
US 2014/0270651 A1 Sep. 18, 2014

(51) Int. Cl.
*G02B 6/38* (2006.01)
(52) U.S. Cl.
CPC ......... *G02B 6/3839* (2013.01); *G02B 6/3861* (2013.01); *G02B 6/3853* (2013.01); *G02B 6/3885* (2013.01)
(58) Field of Classification Search
None
See application file for complete search history.

(56) References Cited

U.S. PATENT DOCUMENTS 4,186,997 A * 2/1980 Schumacher ........ G02B 6/3809
385/65
4,678,272 A * 7/1987 Finn ........................ B29C 70/74
385/141

(Continued)

FOREIGN PATENT DOCUMENTS

CN 1298493 A 6/2001
CN 101206283 A 6/2008

(Continued)

OTHER PUBLICATIONS

International Search Report, International Application No. PCT/US2014/025204, International Filing Date Mar. 13, 2014.

*Primary Examiner* — Andrew Jordan (57) ABSTRACT

A single-piece multi-fiber ferrule interconnect assembly including a ferrule body having a main surface, a front frame, and a rear opening, wherein the front frame includes a front face and a back face; a plurality of lenses arranged to form a lens array, wherein the lenses are fabricated within the front frame and recessed from the front face; a plurality of grooves on the main surface for receiving a plurality of optical fibers, the grooves extending from the back face toward the rear opening, wherein each groove comprises a terminus located at the focal point of a corresponding lens on the front frame; a well located on the main surface along the back face of the front frame, wherein inside edges of the well are curved and wherein the well is capable of accommodating an epoxy; and a plurality of guide pin passageways on the ferrule body each having a pin aperture for receiving alignment pins from a complementary ferrule body, wherein (Continued)

the pin aperture and the alignment pin from the complementary ferrule body align the ferrule front faces such that ends of the optical fibers align.

2 Claims, 8 Drawing Sheets

(56) References Cited

U.S. PATENT DOCUMENTS

| | | | | |
|---|---|---|---|---|
| 5,241,612 | A * | 8/1993 | Iwama | 385/74 |
| 5,764,833 | A * | 6/1998 | Kakii | G02B 6/262 385/43 |
| 6,174,648 | B1 * | 1/2001 | Terao | G02B 6/02138 359/855 |
| 6,424,785 | B1 * | 7/2002 | Melchior | 385/139 |
| 6,442,312 | B1 * | 8/2002 | Terao | G02B 6/02138 385/10 |
| 6,474,877 | B1 * | 11/2002 | Shahid | 385/65 |
| 6,478,475 | B2 * | 11/2002 | Schofield | G02B 6/3839 385/54 |
| 7,510,337 | B2 * | 3/2009 | Takeda | G02B 6/3861 385/65 |
| 7,621,675 | B1 * | 11/2009 | Bradley | G02B 6/3887 385/60 |
| 9,063,304 | B2 * | 6/2015 | Ohta | G02B 6/4214 385/38 |
| 9,268,106 | B2 * | 2/2016 | Lee | G02B 6/4239 |
| 2002/0003932 | A1 * | 1/2002 | Schofield | G02B 6/3839 385/60 |
| 2002/0118929 | A1 | 8/2002 | Brun et al. | |
| 2002/0168150 | A1 * | 11/2002 | Shiino | G02B 6/3833 385/71 |
| 2003/0095582 | A1 * | 5/2003 | Ackley | G02B 6/262 372/108 |
| 2003/0206700 | A1 * | 11/2003 | Bergmann et al. | 385/55 |
| 2004/0017977 | A1 * | 1/2004 | Lam | G02B 6/4204 385/49 |
| 2004/0151439 | A1 * | 8/2004 | Ohtsuka et al. | 385/78 |
| 2004/0184707 | A1 * | 9/2004 | Jewell et al. | 385/14 |
| 2005/0169584 | A1 * | 8/2005 | Takimoto | G02B 6/2746 385/78 |
| 2006/0022289 | A1 * | 2/2006 | Badhei et al. | 257/432 |
| 2006/0245694 | A1 | 11/2006 | Chen et al. | |
| 2006/0291783 | A1 * | 12/2006 | Hamasaki | G02B 6/4249 385/88 |
| 2008/0144999 | A1 | 6/2008 | Takeda et al. | |
| 2009/0324175 | A1 * | 12/2009 | Everett | G02B 6/32 385/72 |
| 2010/0266245 | A1 | 10/2010 | Sabo | |
| 2012/0014648 | A1 * | 1/2012 | Duis et al. | 385/52 |
| 2012/0014650 | A1 * | 1/2012 | Duis | G02B 6/3839 385/65 |
| 2014/0270651 | A1 * | 9/2014 | Kadar-Kallen | G02B 6/32 385/79 |
| 2014/0355934 | A1 * | 12/2014 | Shao | G02B 6/428 385/33 |
| 2015/0198773 | A1 * | 7/2015 | Nakama | G02B 6/3885 385/79 |
| 2015/0247981 | A1 * | 9/2015 | Cruz | G02B 6/3853 385/79 |
| 2016/0054526 | A1 * | 2/2016 | Hodge | G02B 3/0031 385/33 |

FOREIGN PATENT DOCUMENTS

| | | |
|---|---|---|
| CN | 101866035 A | 10/2010 |
| EP | 0241724 A2 | 10/1987 |
| EP | 1081517 A1 | 3/2001 |
| JP | H0915453 A | 1/1997 |

* cited by examiner

MULTI-FIBER FERRULE CONNECTOR

FIELD OF THE INVENTION

The present invention generally relates to a multi-fiber ferrule connector and, more particularly, to a single-piece lensed multi-fiber ferrule connector with epoxy well.

BACKGROUND OF THE INVENTION

Multiple optical fibers are commonly terminated using multi-fiber connectors. In order to interconnect these fibers with a minimum amount of attenuation, corresponding multi-fiber connectors may be mated such that opposing optical fibers are biased into contact with one another. Multi-fiber connectors are mated by establishing direct physical contact between the corresponding optical fibers to transmit the signals propagating along the optical fibers, and to decrease the loss due to reflections experienced by the signals. In order to achieve optimal transmission, multi-fiber connectors are precisely core aligned and are in physical contact using a ferrule. Typically, such ferrules have cooperating alignment pins/holes to align the ferrule end faces such that the fiber ends align and thus make physical contact.

Multi-fiber ferruled connectors (e.g., MT-type ferrule) are typically processed using an adhesive bonding agent between the fiber and ferrule, followed by cleaving and polishing. Multi-fiber ferruled connectors are polished and/or processed to define a proper geometry such that the optical fibers will extend by a predetermined distance beyond the end face of the ferrule so that fiber-to-fiber contact between opposing optical fibers is established. This method of termination makes it difficult to automate. Thus, a need exist for automating the termination process. Such a need is also driven by the market demand for larger quantities at lower prices.

One method of achieving automation is by eliminating the polishing step and by opening the top of the ferrule to aid in the assembly of the fibers. Use of lenses also provides the added benefit of expanding the light, which makes the system less sensitive to dirt on the end faces. Some of the current solutions use separate lenses, which are adhered to the end of a polished ferrule. In other solutions, fibers are located at or near the lenses, such that each fiber is at the corresponding lens' focal point. However, these solutions do not eliminate polishing, require the lenses to be precisely aligned to the fibers, and does not allow for easy assembling. Consequently, a need exists for improvement in multi-fiber ferrule connectors that neither require polishing nor require any lens alignment, provides for improved performance, inspection, and allows for automated manufacturing.

SUMMARY OF THE INVENTION

The present invention provides a single-piece multi-fiber ferrule connector that does not require polishing or any lens alignment. More particularly, the present invention relates to a single-piece multi-fiber ferrule connector including a lens array, v-grooves for fiber alignment, and guide-pin holes for ferrule alignment in a single piece. Embodiments of the multi-fiber ferrule in accordance with the present invention can be assembled using only adhesive and without using a lid. Inventors of the present invention have discovered that by including an epoxy well near the wall of the ferrule against which the fibers abut, contact between the ends of the fibers and the wall can be maintained even if the adhesive fails to affix the fibers to the grooves. Inventors have discovered that the epoxy well provides a mechanical retention feature that aids the pull strength in the −z direction. Inventors have also discovered that further retention of the adhesive in the +y direction can be achieved by forming a dovetail-shaped channel in the main surface of the ferrule body. Further, the inventors observe that de-lamination of the adhesive in the ferrule connector occurs at the sharp edges of the back face or at the sharp edges of the epoxy well. Inventors have prevented this de-lamination by drilling circular wells along the side edges of epoxy well, which provide a reservoir for adhesive and minimizes the adverse effects of shrinkage on the sharp corners of the ferrule and act as a mechanical latch. As an alternative design, inventors have discovered that de-lamination can be prevent by forming the epoxy well in a T-shaped slot relative to the main surface to prevent concentration of stress and de-lamination of the adhesive. This combination of features in the multi-fiber ferrule in accordance with the present invention provides for improved performance, inspection, and automated manufacturing of multi-fiber ferrule connectors.

Accordingly, the present invention relates to a multi-fiber ferrule connector, which comprises: a ferrule body comprising a main surface, a front frame, and a rear opening, wherein the front frame comprises a front face and a back face; a plurality of lenses arranged to form a lens array, wherein the lenses are fabricated within the front frame and recessed from the front face; a plurality of grooves on the main surface for receiving a plurality of optical fibers, the grooves extending from the back face toward the rear opening, wherein each groove comprises a terminus located at the focal point of a corresponding lens on the front frame; and a plurality of guide pin passageways on the ferrule body each having a pin aperture for receiving alignment pins from a complementary ferrule body, wherein the pin aperture and the alignment pin from the complementary ferrule body align the ferrule front faces such that ends of the optical fibers align. More specifically, the grooves for receiving and locating the plurality of fibers are V-shaped and edges of the back face are curved.

In one embodiment of the present invention, the ferrule connector further includes a well located on the main surface along the back face of the front frame, wherein the well is capable of accommodating an epoxy. The inside edges of the well can be curved. In some embodiments the length of the well forms a T-shaped slot relative to the main surface of the ferrule body.

In a second embodiment of the present invention, the ferrule connector further includes circular wells along first and second sides of the epoxy well.

In some embodiments of the present invention, the guide passageways includes a chamfer, wherein a transition from the chamfer to the guide pin passageways is along a plane locating the plurality of lenses.

In another embodiment of the present invention, the guide passageways includes a counter-bore, wherein a transition from the counter-bore to the guide pin passageways is along a plane locating the plurality of lenses.

In yet another embodiment of the present invention, the guide passageways is recessed such that the recess is along a plane locating the plurality of lenses.

In other embodiments of the present invention, the main surface of the ferrule connector is recessed to form a channel for receiving the plurality of fibers. The cross-section of the rear opening and the channel formed on the main surface can be dovetail shaped.

Another aspect of the present invention relates to a ferrule assembly comprising: a ferrule body comprising a main surface, a front frame, and a rear opening, wherein the front frame comprises a front face and a back face, wherein the main surface is recessed to form a channel for receiving the plurality of fibers, and wherein edges of the back face are curved; a plurality of lenses arranged to form a lens array, wherein the lenses are fabricated within the front frame and recessed from the front face; a plurality of grooves on the main surface for receiving a plurality of optical fibers, the grooves extending from the back face toward the rear opening, wherein each groove comprises a terminus located at the focal point of a corresponding lens on the front frame; a well located on the main surface along the back face of the front frame, wherein the well is capable of accommodating an epoxy; and a plurality of guide pin passageways on the ferrule body each having a pin aperture for receiving alignment pins from a complementary ferrule body, wherein the pin aperture and the alignment pin from the complementary ferrule body align the ferrule front faces such that ends of the optical fiber align. More particularly, the grooves for receiving and locating the plurality of fibers are V-shaped and the inside edges of the well are curved. In one embodiment, the cross-section of the rear opening and the channel formed on the main surface is dovetail shaped. In other embodiments, the ferrule connector further includes circular wells along first and second sides of the epoxy well.

In some aspects of the present invention, each of the guide passageways includes one of a chamfer or a counter-bore, wherein a transition from the chamfer or the counter-bore to the guide pin passageways is along a plane locating the plurality of lenses. In other aspects of the present invention, the guide passageways is recessed such that the recess is along a plane locating the plurality of lenses.

DETAILED DESCRIPTION

Figure 1:
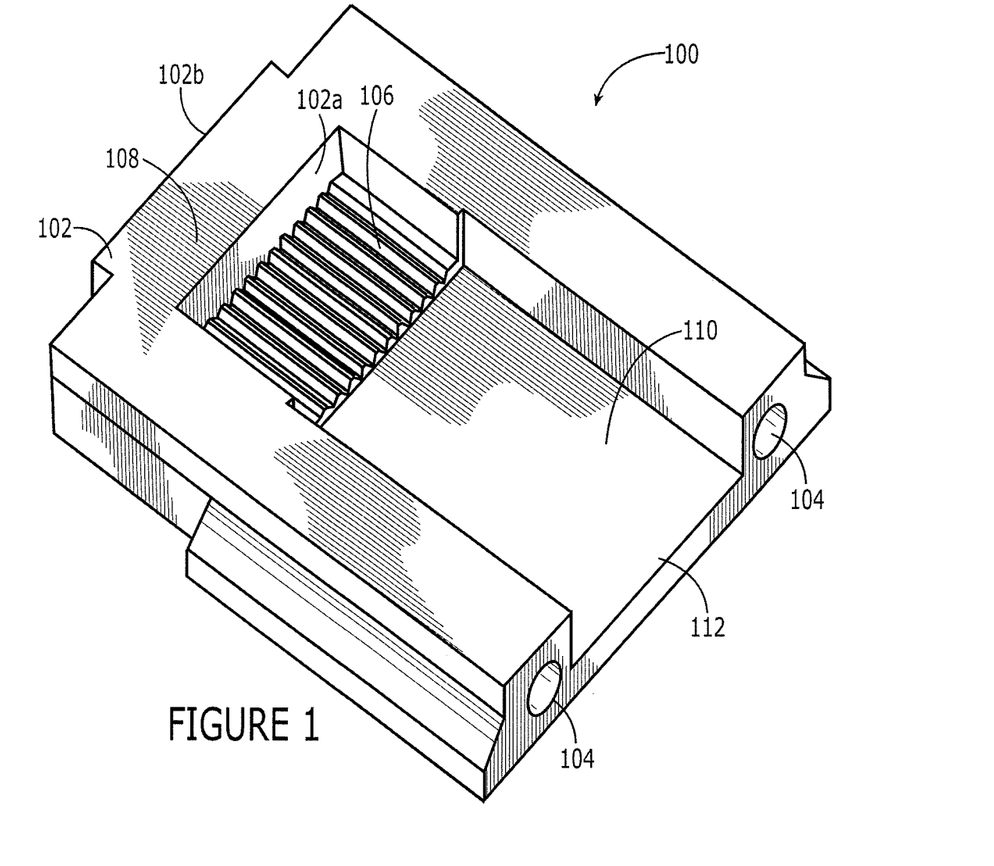
FIG. 1 is perspective view of a multi-fiber ferrule connector in accordance with an embodiment of the present invention.

Referring now to the drawing, and more particularly, to FIG. 1, there is shown a multi-fiber ferrule connector, generally designated 100, which comprises or incorporates the embodiments of the present invention. Multi-fiber ferrule connector 100 includes a front frame 102, pin passageways 104, grooves or channels 106, a lens array 108 on front frame 102, main surface 110, and rear opening 112.

Front frame 102 has an inner portion or back face 102a and a mating surface or front face 102b on opposite side from inner portion 102a. Connector 100 is fabricated from an optical grade plastic with a refractive index similar to that of the optical fiber, such as polycarbonate, crystal, glass, ceramic or silica. A plurality of lenses arranged in the form of a lens array 108 are fabricated within the front frame 102 and slightly recessed within the front frame 102 and below or from the mating surface 102b. In some embodiments of the present invention, the lenses in lens array 108 may comprise collimating lenses, for those instances where the ferrule is to be mated with a complementary ferrule, or focusing lenses, for those instances where the ferrule is to be mated with an active device, i.e., a light source or receiver. A pair of guide pin passageways 104 having pin apertures is provided in connector 100 for receiving alignment pins (not shown) and to ensure that two mating ferrules, or one complementary to the other, are aligned.

Connector 100 generally comprises a main surface 110 having grooves or channels 106 for receiving and locating optical fibers therein. Main surface 110 is also recessed to form a channel for receiving the plurality of fibers. Although FIG. 1 illustrates grooves 106 having a V-shaped cross-sectional profile, it is understood that grooves 106 having different cross-sectional profiles, e.g., semi-circular grooves or rectangular grooves, may be equally employed. Each groove comprises a terminus near the focal point of a corresponding lens on front frame 102 to ensure true position of the lenses relative to grooves 106.

Figure 2A:
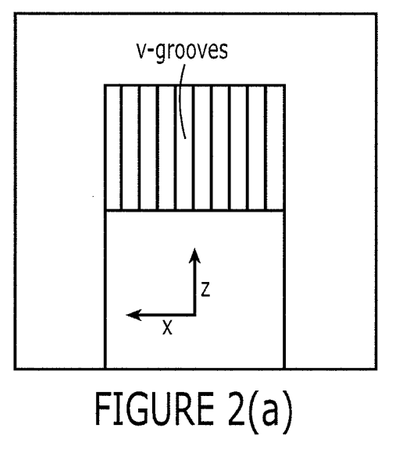
FIG. 2 is perspective view of a multi-fiber ferrule connector in accordance with an alternate embodiment of the present invention.
Figure 2B:
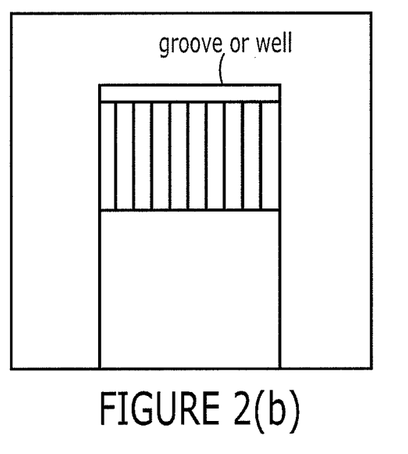
Figure 2C:
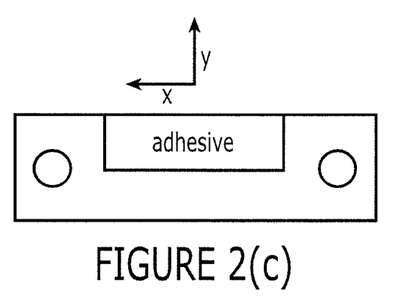
Figure 2D:
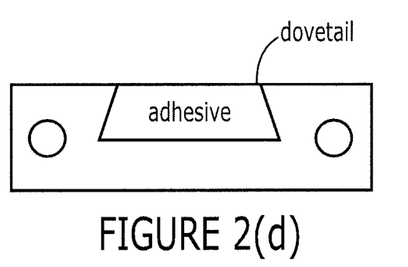
Figure 3:
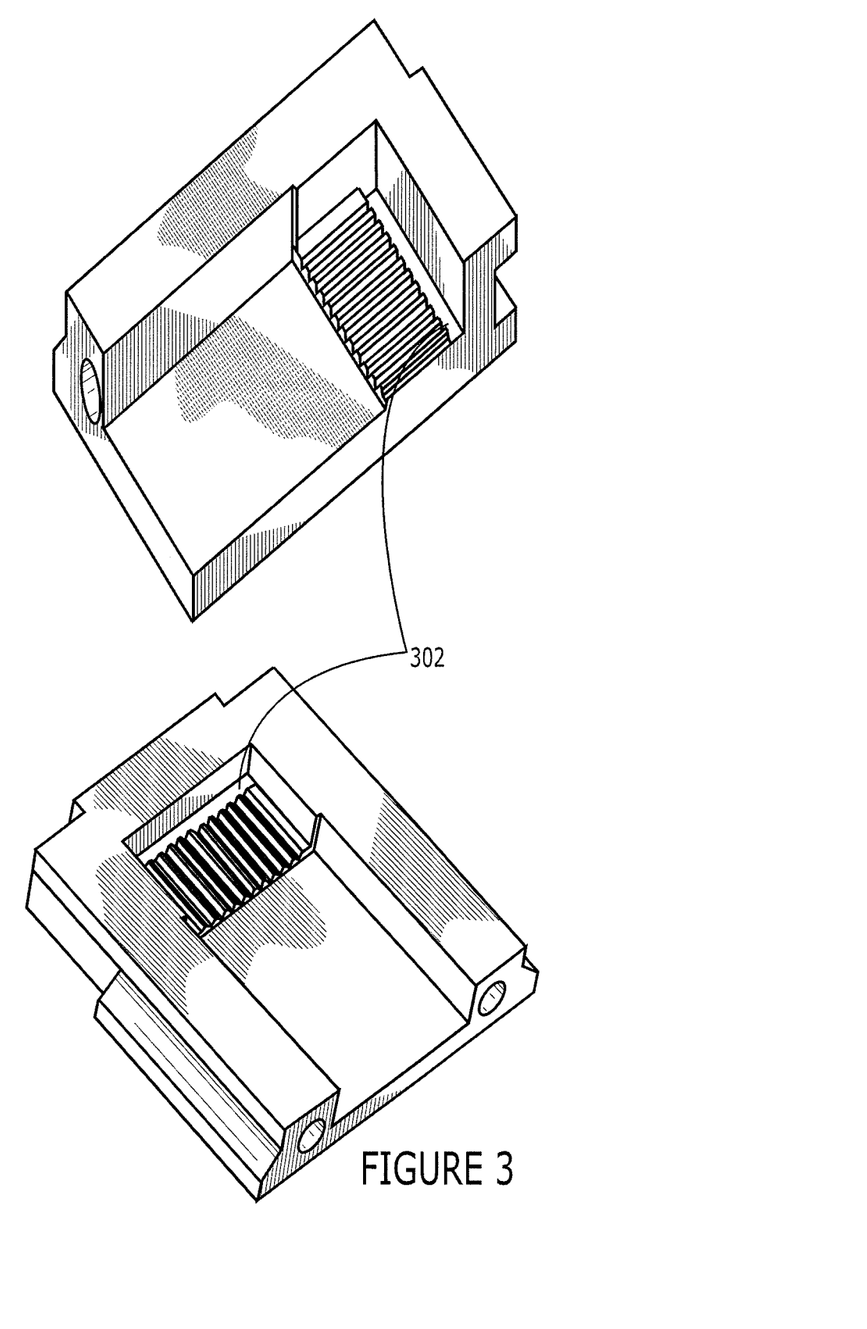
FIG. 3 is a perspective view of a multi-fiber ferrule connector including an epoxy well.

Multi-fiber ferrule connectors in accordance with embodiments of the present invention rely on adhesive to retain the fibers in the ferrule. A difference in coefficient of thermal expansion (CTE) can exist between multi-fiber ferrule connector 100, adhesive (high CTE) and fibers (low CTE). If the adhesive were to fail to adhere to the ferrule, but remain adhered to the fibers, then the assembly of fibers and cured adhesive can be removed by moving the ferrule in either the +y or −z directions (See FIG. 2). However, it is important to maintain contact between the ends of the fibers and the wall of the ferrule against which the fibers abut. In an alternative embodiment of the present invention, an epoxy well 302 can be included in connector 100, as shown in FIGS. 2(b) and 3, to increase mechanical retention of the fibers to the ferrule wall 102a by reducing stress at the ferrule-adhesive-fiber interface. If the ferrule-adhesive-fiber interface fails, the epoxy in epoxy well 302 can oppose stress concentrating at the ferrule-adhesive-fiber interface, thereby extending the operating temperature range of the assembly. The epoxy in epoxy well 302 provides mechanical retention to the fibers and the optical properties of the epoxy maintain an optical path. Epoxy well 302 is located on the main surface 110 along back face 102a of front frame 102 and perpendicular to a longitudinal axis of main surface 110. Epoxy well 302 anchors the adhesive, and hence the fibers, near the ends of the fibers. In some embodiments of the present invention, low modulus adhesive can be used to prevent adhesive failures due CTE mismatch between multi-fiber ferrule connector 100, adhesive (high CTE) and fibers (low CTE). In other embodiments of the present invention, gels can be provided at the ends of the fibers to fill any gaps between fiber and ferrule wall. The gels can reduce losses due to refraction through low index media, such as air.

In some embodiments of the present invention, an epoxy well 302 can be located near the interface between fiber and front frame 102. Unlike conventional techniques, which includes having adhesives in v-grooves and limiting adhesive access to the fiber from below, epoxy well 302 allows fibers to be completely surrounded by adhesive for a stronger adhesive joint. Epoxy well 302 also adds a mechanical shoulder to an adhesive joint and provides a compressive component to the adhesive interface. The compressive component to the adhesive interface prevents the fiber from pulling away from the ferrule wall during thermal cycling, which generally occurs due to the mismatch in CTE between the fiber and polymer ferrule. Epoxy well 302 provides a mechanical retention feature that aids the pull strength in the −z direction. Further retention of the adhesive in the +y direction can be achieved by forming a channel in main surface 110 such that the cross sections of the channel and rear opening 112 are of a dovetail shape, as shown in FIG. 2(d).

Figure 4:
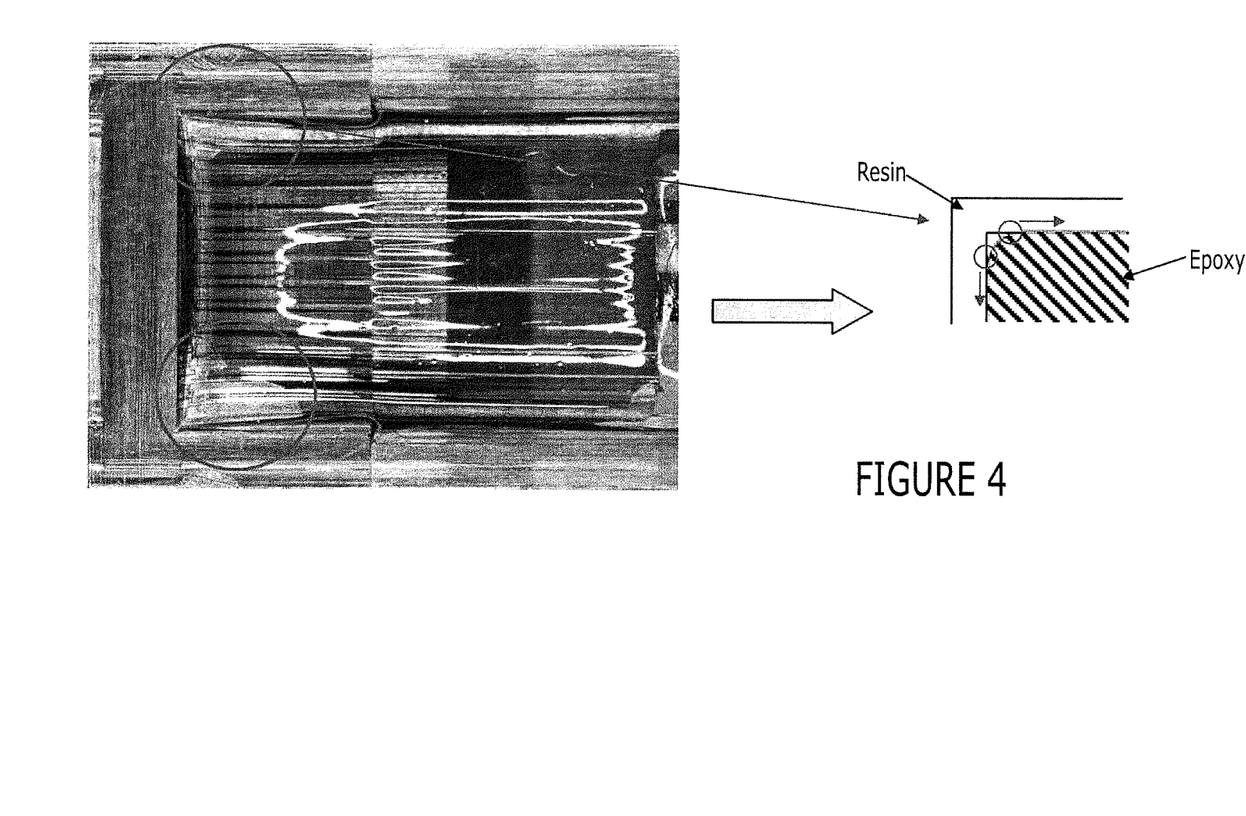
FIG. 4 illustrates exemplary delamination in a conventional multi-fiber ferrule connector.
Figure 5:
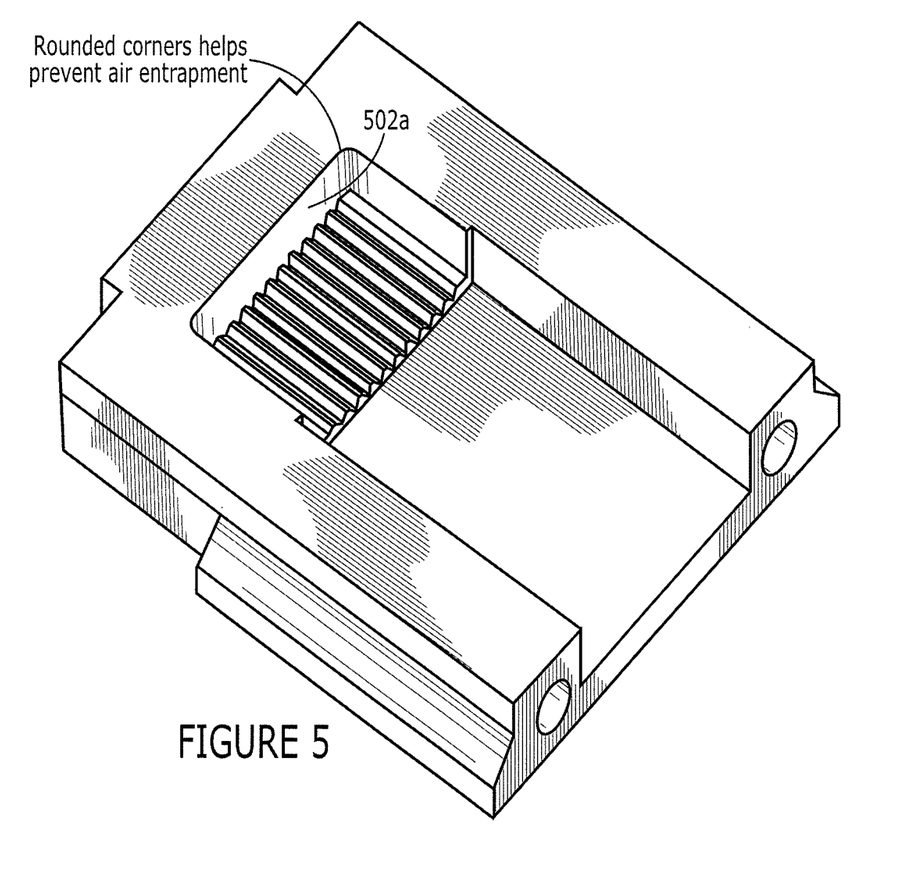
FIG. 5 is a perspective view of multi-fiber ferrule connector in accordance with an alternate embodiments of the present invention including a rounded or curved corner on its back face.
Figure 6A:
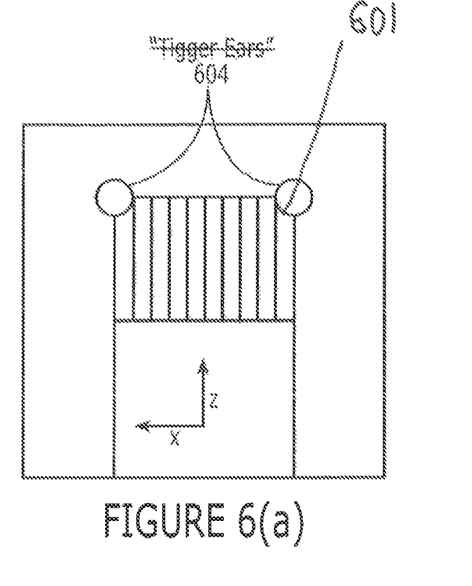
FIG. 6 is a perspective view of multi-fiber ferrule connectors in accordance with alternate embodiments of the present invention including a rounded or curved corner on the back face, and "T" slot epoxy well.
Figure 6B:
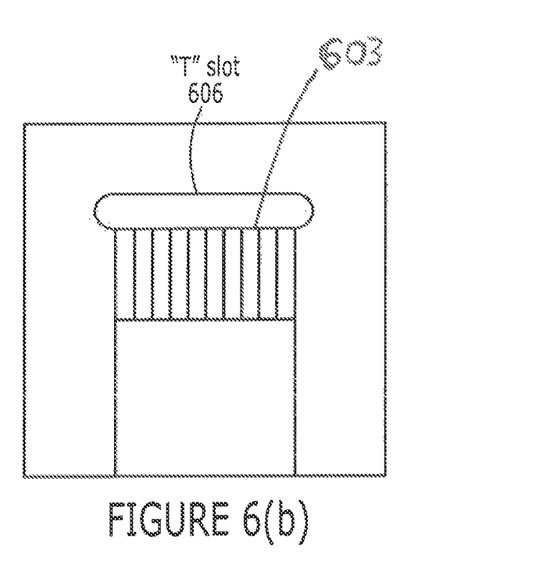
Figure 6C:
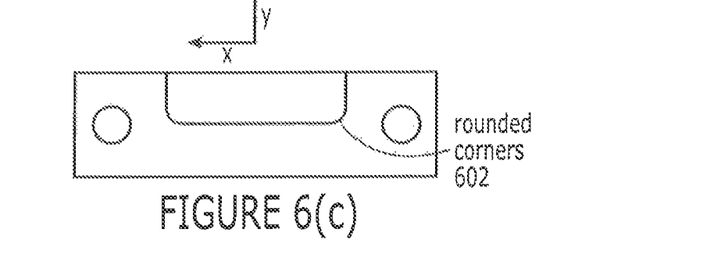
Figure 7:
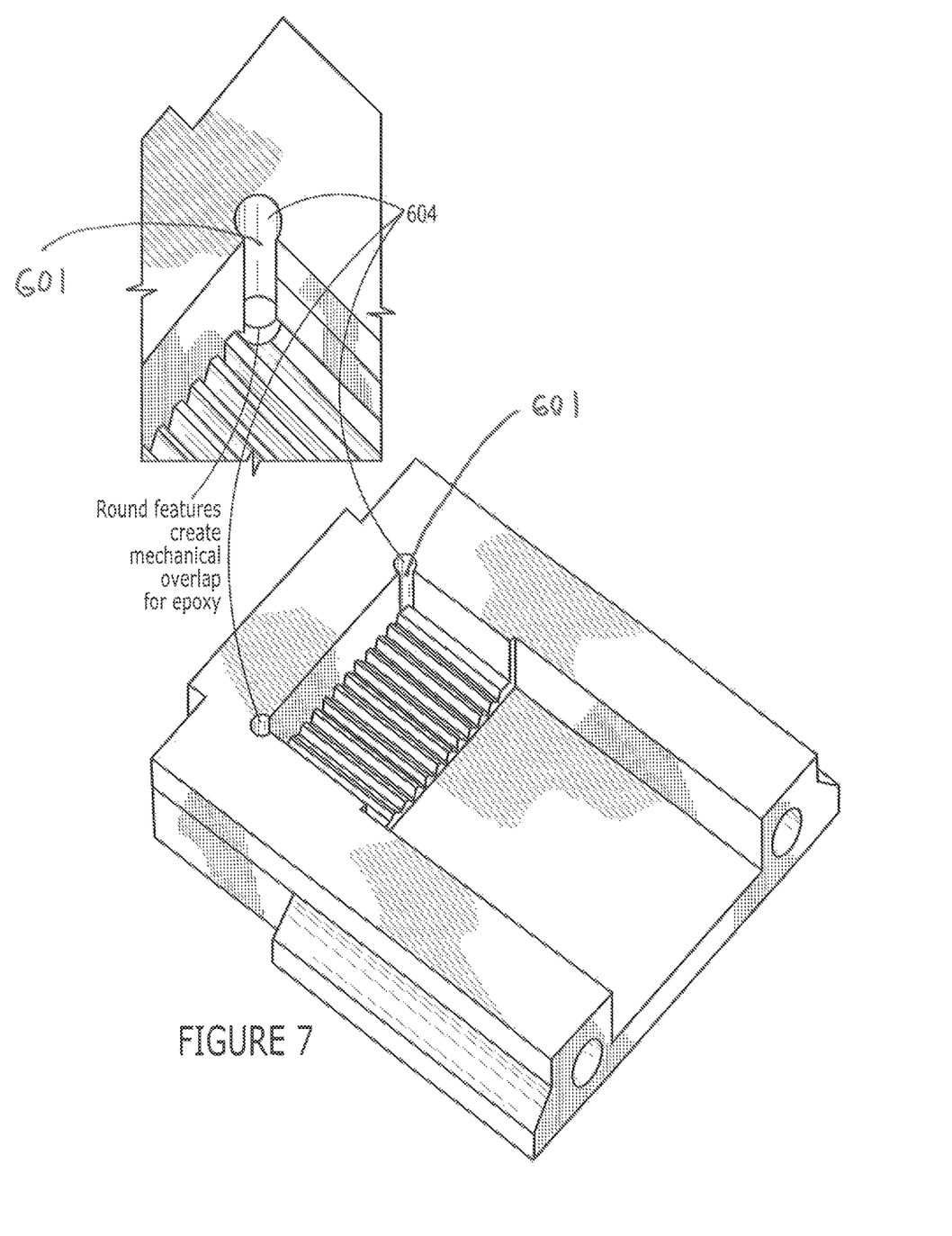
FIG. 7 is a perspective view of multi-fiber ferrule connectors in accordance with alternate embodiments of the present invention.

As the adhesive cures in connector 100, it shrinks pulling away from the edges and the sharp edges of back face 102a or sharp edges of epoxy well 302, as shown in FIG. 4, which often forms the starting point for de-lamination of the adhesive. In one embodiment of the present invention, edges of back face 502a or inside edges of epoxy well 602 are curved or rounded off, as shown in FIGS. 5 and 6(c) respectively, to prevent concentration of stress and de-lamination of the adhesive. In another embodiment of the present invention, blind holes or circular wells 604, as shown in FIGS. 6(a) and 7, are drilled along side edges of epoxy well 602 in connector 100 to provide a reservoir for adhesive and minimizes the adverse effects of shrinkage on the sharp corners of the ferrule. In one embodiment of the present invention, depth of circular wells 604 is substantially equal to the depth of epoxy well 602. These circular wells 604 can also act as a mechanical latch. Specifically, as shown in FIGS. 6(a) and 7, the wells 602 have a restrictive opening 601, thus creating a mechanical overlay, that restricts egress from the well and locks the cured adhesive in the well. In yet another embodiment of the present invention, epoxy well 602 is shaped in the form of a T-shaped slot 606 ("T" slot) relative to the main surface 110, as shown in FIG. 6(b), to prevent concentration of stress and de-lamination of the adhesive. Specifically, as shown in FIG. 6(b) the well 606 have a restrictive opening 603 that restricts egress from the well and locks the cured adhesive in the well.

Volume of an epoxy well can be adjusted to accommodate minimum epoxy needed to encapsulate and mechanically capture the fibers. In some embodiments of the present invention, minimum epoxy needed to encapsulate and mechanically capture the fibers, and thus volume of an epoxy well, may be adjusted by shortening the length of fiber in grooves 106. A shorter strip of fibers will require a lower volume of epoxy and, thus, a lower volume of epoxy is required in an epoxy well. Such methods of restricting epoxy volume and controlling volume of epoxy dispensed reduces cost, reduces time and energy needed to cure the epoxy, and reduces CTE-based stresses in the assembly, which in turn has a significant effect in reducing thermal mismatch stresses.

Figures 8A, 8B:
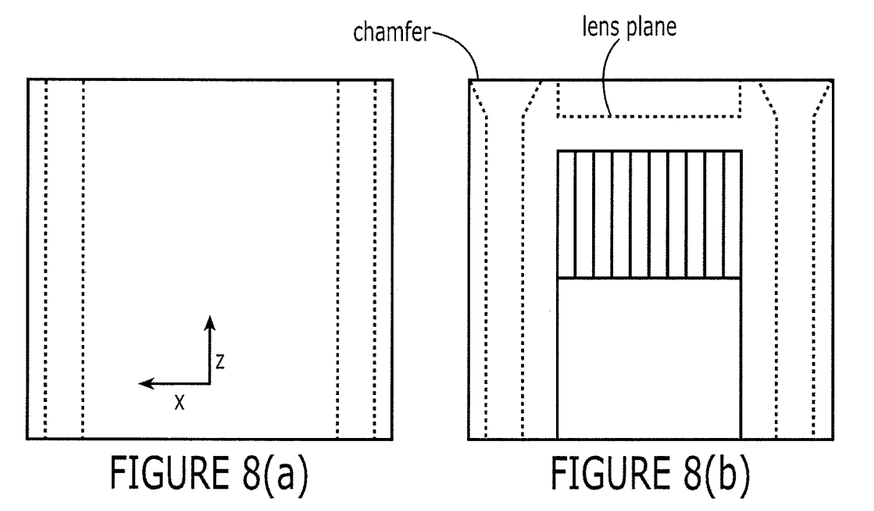
FIG. 8 is a perspective view of multi-fiber ferrule connectors in accordance with alternate embodiments of the present invention including a guide passageways with chamfer, counterbore or recessed hole.
Figure 8C:
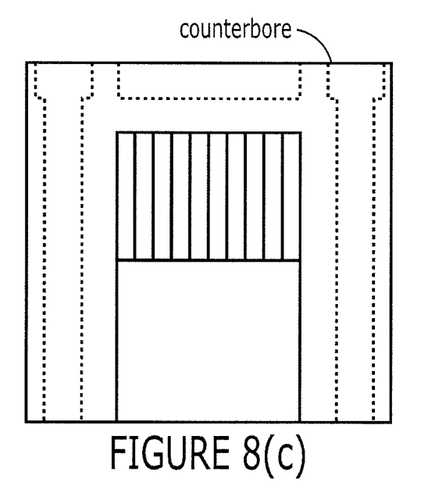
Figure 8D:
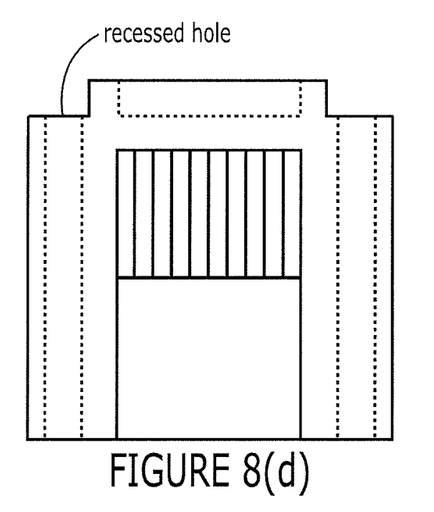

In some aspects of the present invention, guide pin passageways 104 includes a chamfer and/or a counter-bore, as shown in FIGS. 8(b) and 8(c), to isolate debris that can collect in guide pin passageways 104 from the mating surface. Interactions between the guide pins and guide pin passageways 104 can generate debris, especially in MT ferrules where the pin-hole fit is tight, which in turn can cause premature failure during repeated matings of connector 100. In other aspects of the present invention, surfaces of guide pin passageways 104 is recessed such that it is coplanar with the base of the lenses, as shown in FIG. 8(d), to isolate debris that can collect in guide pin passageways 104 from the mating surface. This facilitates visual inspection of the relative locations of the guide pin passageways 104 and lenses. A similar advantage can be achieved with the counter-bore or chamfer if the point of transition from counter-bore or chamfer to guide pin passageways 104 is on the same plane as the lenses, as shown in FIGS. 8(b) and 8(c).

By including pin passageways, grooves or channels, and a lens array on front frame in a single-piece connector, mold steel having sufficient precision for mass production can be designed and manufactured. Once the mold steel is manufactured and verified, mass production of connector 100 is attainable. Connector 100 allows for aligning fibers in v-grooves and bonding them in place without the need for a lid. The use of v-grooves as an alternative to blind holes allows for easier fiber feeding or positioning. The open design also aids in application of adhesive to fibers and UV curing. Embodiments in accordance with the present invention also allow for the use of waveguides as an alternate to fibers in ferrule grooves.

It is thought that the multi-fiber ferrule connector of the present invention and many of its attendant advantages will be understood from the foregoing description and it will be apparent that various changes may be made in the form, construction arrangement of parts thereof without departing from the spirit and scope of the invention or sacrificing all of its material advantages, the form hereinbefore described being merely a preferred or exemplary embodiment thereof.

What is claimed is:

1. A ferrule assembly comprising:
a ferrule body defining a channel, a main surface at the bottom of said channel, a front frame forward of said channel, and a rear opening rearward of said channel, wherein the front frame comprises a front face and a back face and a plurality of lens, said channel being configured to receive and secure fibers relative to said plurality of lens;
at least one well located adjacent the back face of the front frame, said at least one well being contiguous with said channel and being in fluid communication with said channel such that liquid adhesive applied to said channel flows into said at least one well;
a restrictive opening between said at least one well and said channel, said restrictive opening limiting egress from said at least one well, thereby preventing, cured adhesive in said at least one well from passing through said restrictive opening to said channel, thereby anchoring said fibers in place on said main surface.

2. The ferrule assembly of claim 1, wherein said ferrule body comprises first and second sides on each side of said channel, and wherein said at least one well comprises circular wells, one of said wells disposed adjacent the intersection of said front frame and said first side, and another of said wells disposed adjacent the intersection of said front frame and said second side.

* * * * *